United States Patent
Walton

[15] 3,694,120
[45] Sept. 26, 1972

[54] APPARATUS FOR THE PRODUCTION OF SHEETS OF PLASTICS OR LIKE MATERIALS

[72] Inventor: George N. Walton, Sterling, Castleton Road, Royton, Lancashire, England

[73] Assignee: David Bridge & Company Limited

[22] Filed: Feb. 6, 1970

[21] Appl. No.: 9,363

[30] Foreign Application Priority Data

Feb. 7, 1969    Great Britain............6,775/69

[52] U.S. Cl. ..................425/145, 425/149, 425/224, 425/327, 425/381, 425/466
[51] Int. Cl. ............................B29f 3/012, B29f 3/06
[58] Field of Search.18/2 C, 2 HA, 9, 10, 11, 12 DR, 18/12 R, 15, 12 DS; 425/145, 224, 327, 381, 466, 149

[56] References Cited

UNITED STATES PATENTS 3,274,645    9/1966    Chase.....................18/12 DR
3,000,438    9/1961    Alexander.................18/2 HA
2,567,704    9/1951    Grimes....................18/12 DR
3,543,333    12/1970   Anders et al............18/12 DR

FOREIGN PATENTS OR APPLICATIONS 999,947    2/1952    France....................18/12 DR Primary Examiner—J. Spencer Overholser
Assistant Examiner—Norman E. Lehrer
Attorney—William J. Daniel

[57]    ABSTRACT

A roller die for use in producing sheets of plastics or like material comprises an extruder having a variable extrusion orifice which may be adjusted to maintain the pressure distribution across the nip of the calender rolls substantially constant. The orifice is at least in part defined by two orifice forms carried by two members which may be rotated to vary the extrusion orifice.

8 Claims, 7 Drawing Figures

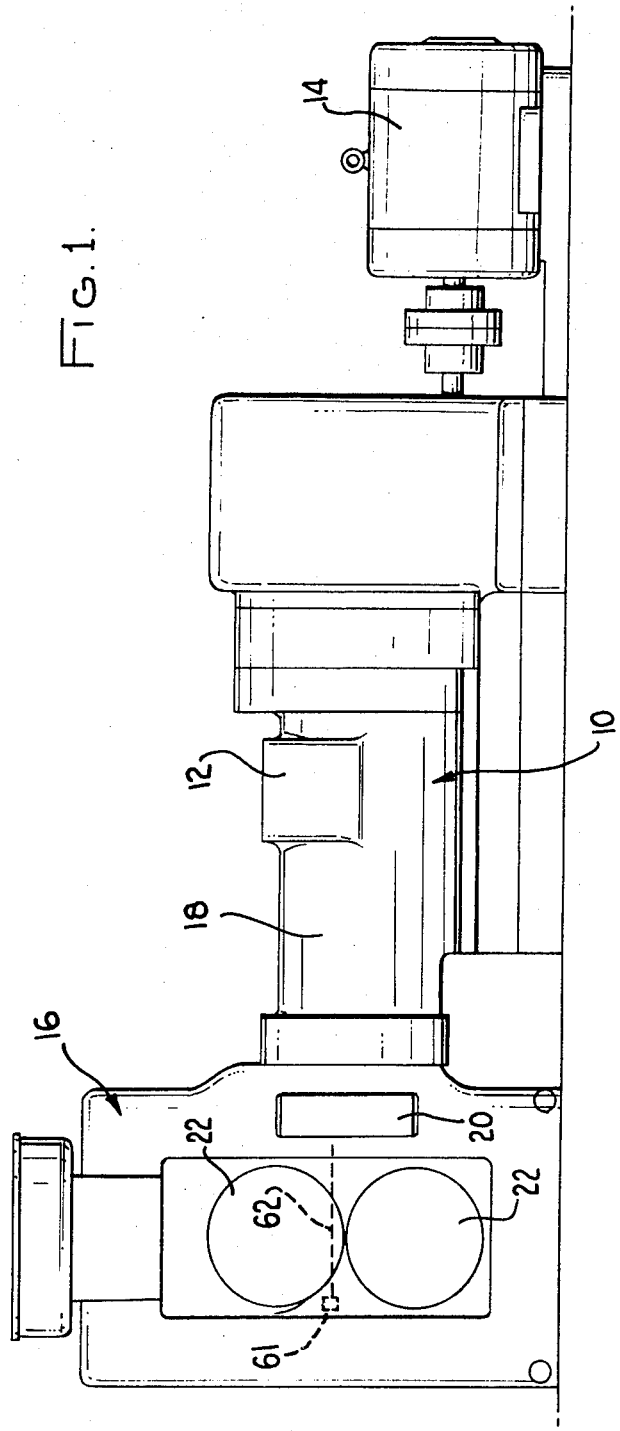

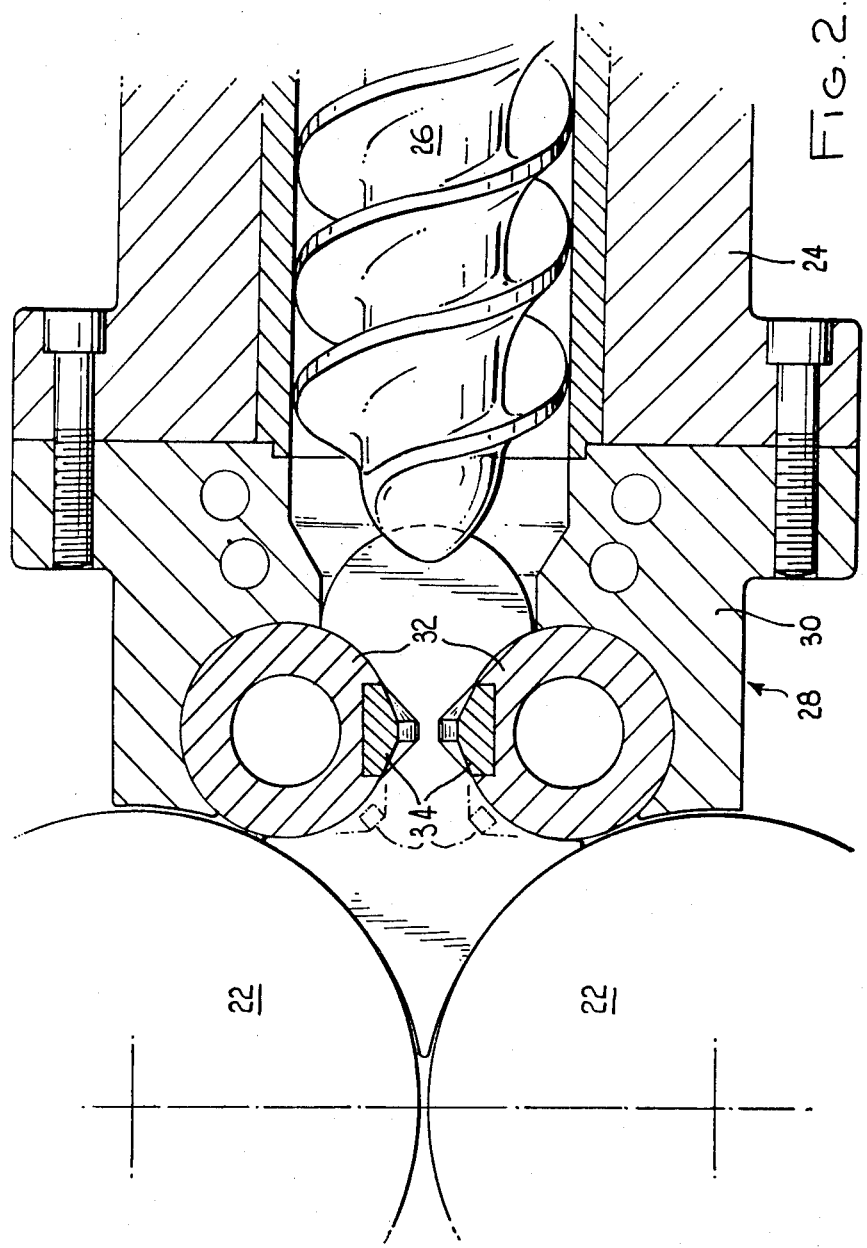

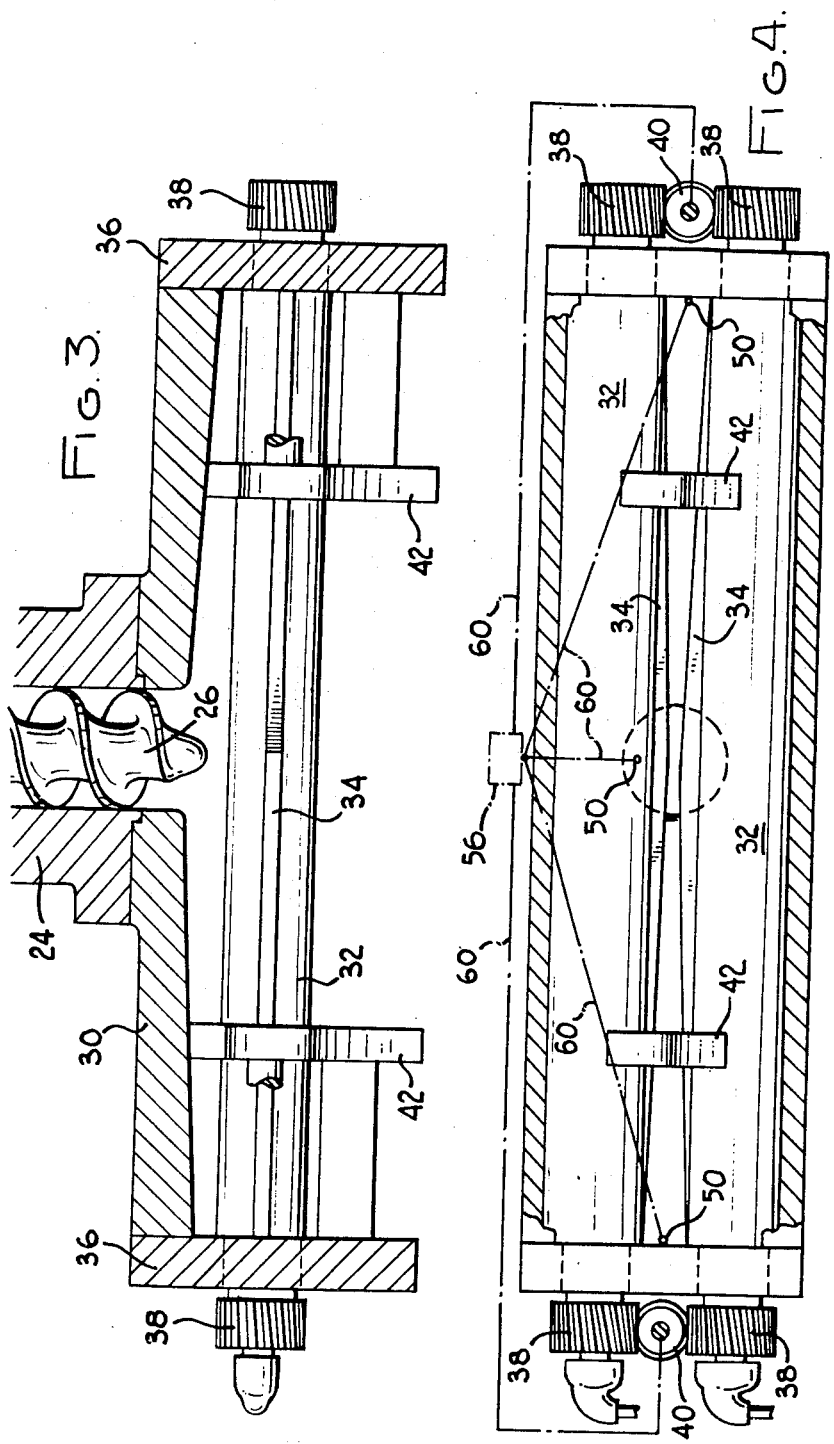

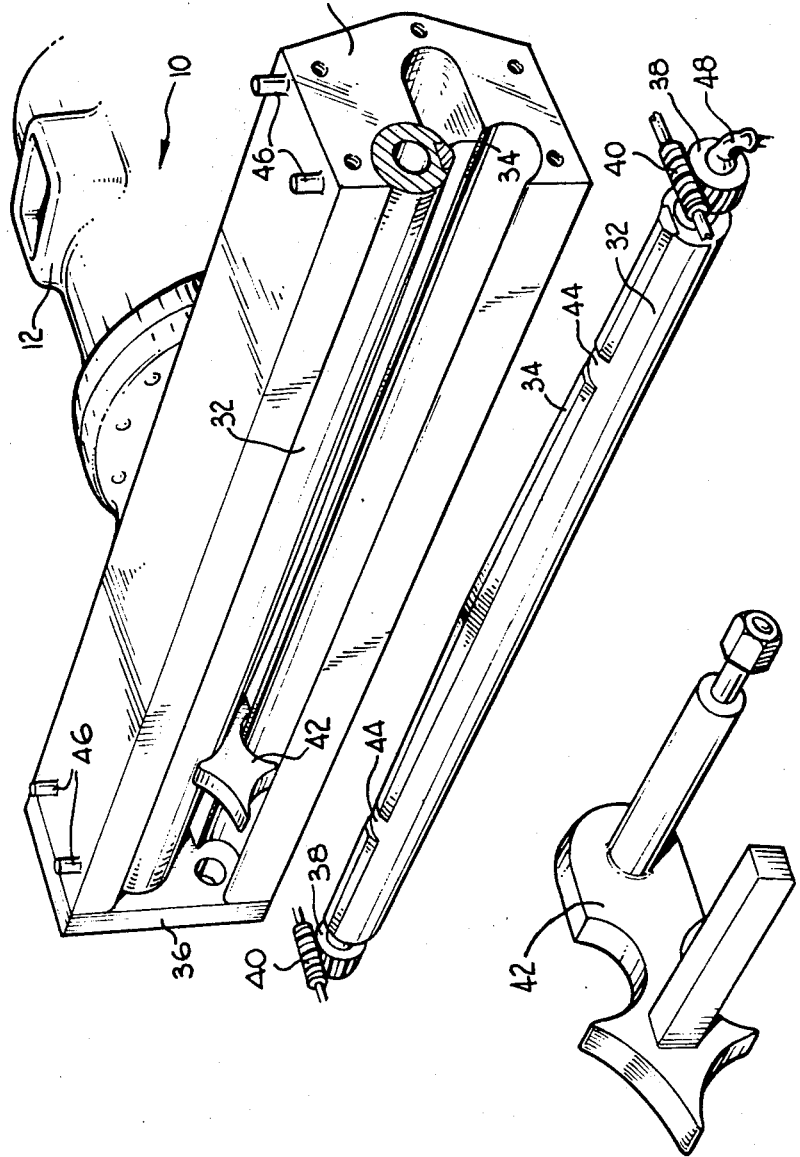

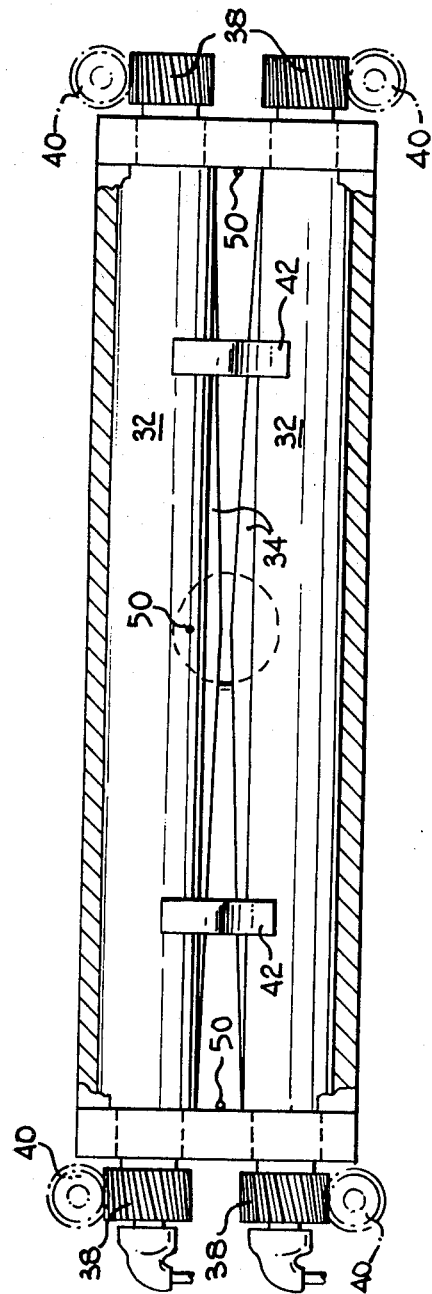

PRODUCTION OF SHEETS OF PLASTICS OR LIKE MATERIALS

This invention concerns the production of sheets of plastics or like material.

When it is desired to produce sheets of plastics or like material it is usual to use either a conventional calender to which the material is fed at atmospheric pressure or a roller die (a combined conventional extruder and calender) to provide a pressurized feed to the calender rolls. When thick sheet is required the roller die is superior to the calender alone because such sheets can be produced at one pass with no air inclusions; When using only a calender it is necessary to produce a plurality of thin sheets in numerous passes and subsequently to ply these sheets together to produce one thick sheet. On the other hand, the roller die is not as accurate as a conventional calender alone when producing thin sheets. For these reasons a roller die tends to be used for producing thick sheets, and a calender for producing thin sheets.

The object of the present invention is to provide a roller die which is capable not only of producing thick sheets as previously described, but which is also capable of producing thin sheets with an accuracy which is comparable with that obtainable with a conventional calender along. The invention is based on the appreciation of the fact that the accuracy of the dimensions of sheet produced by a roller die depends upon the even distribution of pressure across the nip between the calender rolls.

According to the present invention a roller die includes a variable extrusion orifice by adjustment of which the distribution of pressure across the nip between the calender rolls may be arranged to be substantially constant.

The invention may be performed in various ways and two specific embodiments, with some possible modifications, will now be described by way of example, with reference to the accompanying drawings in which:

FIG. 1 is a diagrammatic front elevation of a roller die constructed according to the present invention;

FIG. 2 is a sectional front elevation to an enlarged scale of part of the roller die shown in FIG. 1;

FIG. 3 is a sectional plan view, to a somewhat smaller scale, of the roller die head shown in FIG. 2;

FIG. 4 is a sectional end elevation corresponding to FIG. 3;

FIG. 5 is a exploded perspective view of a roller die head suitable for use in the roller die;

FIG. 6 is a perspective view of a guide as used in the roller die head shown in FIG. 5; and FIG. 7 is a view similar to FIG. 4 of a modified arrangement.

Referring first to FIG. 1 a roller die comprises an extruder 10, having a feed hopper 12 and a feed screw (not shown in FIG. 1) driven by a motor 14, and a calender 16. The extruder 10 also has a head 18 and this head 18 is secured to the calender 16 by a latch 20. By means of the head 18 the extruder 10 feeds material direct to the central line of the nip of rolls 22 of the calender. The head 18 has a variable extrusion orifice by adjustment of which the distribution of pressure across the nip between the calender rolls 22 may be arranged to be substantially constant, and which will be later described in detail.

Referring now to FIGS. 2 to 6, the body 24 of the extruder 10, within which is rotatably mounted the extruder feed screw 26, has bolted thereto an extrusion head 28. The extrusion head 28 includes a body member 30 in which are rotatably mounted about axes parallel to the axes of the rolls 22 a pair of hollow tubes 32 equidistant above and below the nip between the calender rolls 22. Each tube 32 has a key-way in each of which is firmly secured an orifice lip form 34, which defines an orifice of varying thickness as is readily discernible from the drawings, particularly FIG. 4. The axis of member 32 lies generally within a plane extending perpendicular to the extrusion direction and passing substantially through the lip section when the member is in the position shown in FIG. 2. Each tube 32 is journalled in end plates 36 by means of reduced diameter end portions, which carry worm wheels 38 which mesh with worms 40. Shaped guides 42 sealingly engaging slots 44 in the orifice forms 34 determine the width of the extrusion orifice. The body member 30 may be of hollow construction with feed and exit ports 46 for fluid for heating or cooling purposes. Likewise the hollow tubes 32 may have glands 48 for the supply thereto of a heating or cooling fluid. By means of the worm 40 and worm wheels 38 the position of the tubes 32 and thus the orifice forms 34, may be adjusted, and in FIG. 2 the closed and open positions of the forms 34 are shown, the former in full line and the latter in chain lines. The tubes 32 and forms 34, or the forms 34, can be readily changed.

In operation we have found that, with the calender rolls 22 set for a given sheet thickness, the orifice forms 34 can be adjusted between the two positions shown to give substantially constant pressure laterally across the nip between the calender rolls, and therefore a sheet of very accurately controlled thickness. This is so even for very thin sheets. The need to provide for making relative adjustments of the calender roll axes, or bending or cambering of these rolls, is obviated.

In an alternative arrangement shown in FIG. 7, the tubes 32 are arranged to be adjusted independently of each other, worms 40a being separately associated with the worm wheels 38.

The variable extrusion head may be arranged to be automatic in operation. This is arranged, for example, by providing pressure transducers 50 at locations spaced across the extrusion head, for example at the center and sides of the head, and arranging for these to operate means for turning the worms 40 appropriately to adjust the orifice form or forms 34 to equalize the pressure across the head should this become uneven, for example, the pressure sensing transducers can be connected to a servo mechanism 56 arranged to control the position of one or both of the tubes 32, as indicated diagrammatically at 60. Alternatively or additionally a feed-back control 61 may be provided which senses variation in the thickness of the sheet being produced and operates the worms 40 accordingly through a connection 62, as indicated diagrammatically in FIG. 1.

A thin sheet of rubber or plastics may have a thickness of between 0.003 inch and 0.008 inch, for example, and a thick sheet a thickness of between 0.009 inch and 0.25 inch, for example, but these values are not intended to be limiting.

What I claim is:

1. An extruder-roller die for use in the production of sheets of plastics or like material and comprising a calender having a pair of rolls through which the material passes to form a sheet, an extruder arranged to discharge the material under pressure through an elongated extrusion orifice into the nip between the calender rolls, at least one elongated member extending along and defining a portion of the orifice periphery and having a lip section extending therealong to serve as the orifice edge, said member being mounted for pivotal movement about an axis parallel to the roll axis with the distance between said lip section edge and said member axis varying along the length of said member to define an orifice of varying thickness, said pivotal axis being disposed to lie generally within a plane extending perpendicularly of the extrusion direction and passing substantially through said lip section edge in one pivotal position of the member, and means for pivoting said elongated member about said pivotal axis to change the orifice thickness along at least a portion of its length.

2. An extruder-roller die as claimed in claim 1 including pressure sensing means operating to sense the pressure at positions spaced across the nip, said means for pivoting the member being responsive to the sensed pressures to maintain the pressure across the nip substantially constant.

3. An extruder-roller die as claimed in claim 1 comprising two substantially parallel elongated pivotable members arranged on generally opposite sides of said orifice, at least one of said members being rotated to vary the orifice thickness.

4. An extruder-roller die as claimed in claim 1, in which said pivotally-mounted member comprises a removable elongated insert forming the lip section thereof.

5. An extruder-roller die as claimed in claim 4, in which the thickness of each insert tapers generally uniformly from a central point to each of its ends.

6. The die of claim 1 wherein the surface of said member upstream of said lip section is smoothly contoured to feed the extruded material to the orifice periphery constituted at least in part by said lip section.

7. The die of claim 1 wherein said member is generally cylindrical in cross-section and is mounted for pivotal movement about its own axis.

8. The die of claim 7 wherein the surface of said lip section immediately adjacent said orifice edge in the upstream direction extends substantially tangentially of the general cylindrical periphery of said member.

* * * * *